April 27, 1948.   C. H. FAY   2,440,503
MAGNETIC GRADIOMETER
Filed Jan. 11, 1945   2 Sheets-Sheet 1

Inventor: Charles H. Fay
By his Attorney:

Patented Apr. 27, 1948

2,440,503

UNITED STATES PATENT OFFICE 2,440,503

MAGNETIC GRADIOMETER

Charles H. Fay, Houston, Tex., assignor to Shell Development Company, San Francisco, Calif., a corporation of Delaware Application January 11, 1945, Serial No. 572,278

4 Claims. (Cl. 175—183)

This invention pertains to the art of magnetic exploration, and relates more specifically to instruments for the measurement of magnetic fields and gradients. Such measurements are useful for purposes of subterranean exploration for bodies such as petroleum or ore deposits, and more particularly for the location of hidden or underground bodies containing magnetic material. This application is a continuation-in-part of my copending applications Ser. No. 514,581, filed December 15, 1943, now Patent No. 2,425,180, and Ser. No. 569,819, filed December 26, 1944.

While magnetometers such, for example, as the Schmidt vertical magnetometer, can be used successfully to detect such bodies through the magnetic effects exerted thereby, their use is extremely time-consuming because of the orientation and precise leveling required at each of a relatively large number of stations. It is obvious from the fact that the normal field of the earth has a negligible gradient compared to that produced by a body susceptible of location by magnetic means, that a magnetic gradiometer is more suitable for locating such objects. For an instrument measuring the vertical gradient of the vertical component of the field, for example, no orientation and only rough leveling such as can be obtained by suspending the instrument from a suitable support is required for all but the most precise work, so that continuous observation by an operator walking with the instrument will usually suffice.

In my copending application Ser. No. 569,819, filed December 26, 1944, I have disclosed a device for measuring magnetic fields, said device comprising a vibrator coil, an optical system and photocell arranged to transform the displacement of said vibrator into a voltage, an amplifier to amplify said voltage, a set of Helmholtz coils arranged to reduce the total field component at the vibrator to a value just permitting oscillation of the system as a feedback oscillator, the adjustment of the direct current in said Helmholtz coils being effected manually or, where preferable, automatically, as disclosed in said application, said direct current or changes in said current from its value being measured, if desired, at a base station.

It is the object of the present invention to provide a system which combines two vibrators and associated sets of Helmholtz coils to measure the difference between values of a component of the external magnetic field at the said vibrators, said difference divided by the distance between vibrators being the gradient in the direction of the line between vibrators of the said component. For simplicity, this system will be described herein with regard to an arrangement suitable for measuring the vertical gradient of the vertical component of the magnetic field, but nothing herein shall be held to limit the invention as regards obvious modification to measure the same or other gradients of other or the same components.

This and other objects of the present invention will be understood from the following description taken with reference to the attached drawings, wherein.

Figure 1:
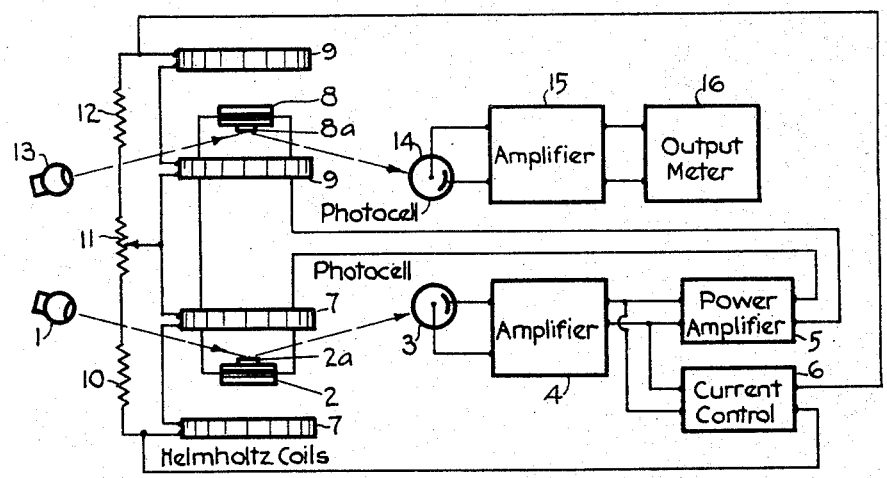
Fig. 1 is a diagram schematically showing an embodiment of the present invention.
Figure 2:
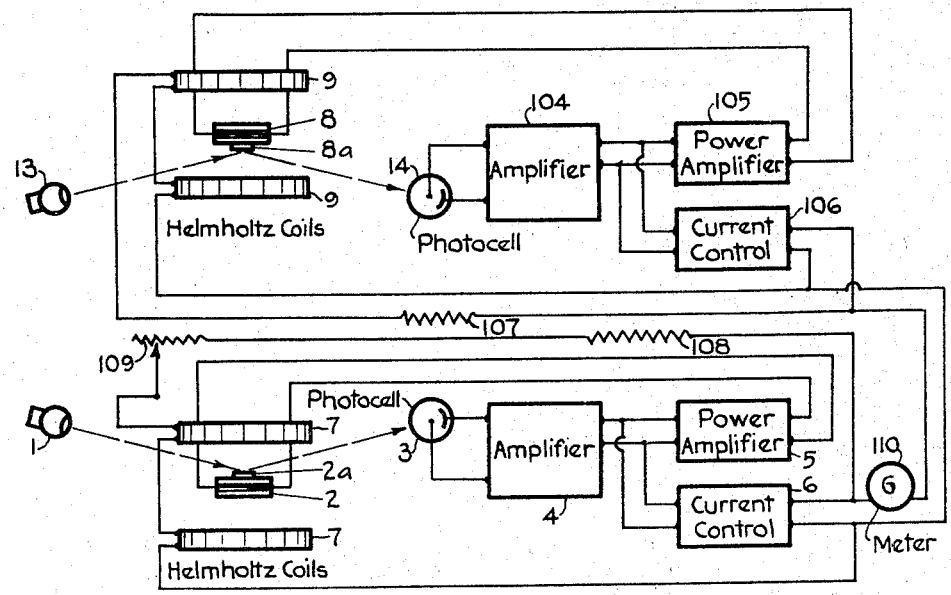
Fig. 2 is a diagram of a modified embodiment of the invention.

Referring to Fig. 1, light train means comprising a light source 1, a vibrator 2, provided with a mirror 2a, a photocell 3, an amplifier 4, a power amplifier 5, Helmholtz current control 6 provided with means for rectifying the amplified alternating current received, and Helmholtz coils 7 function after the manner described in my copending application Ser. No. 514,581, now Patent No. 2,425,180 and copending application Ser. No. 569,819. Details of a circuit suitable for Helmholtz current control 6 are shown in Fig. 2 of application Ser. No. 569,819. A second vibrator 8 provided with a mirror 8a, impinged upon by light from a source 13, is connected in series with vibrator 2 so that said second vibrator is also driven by power amplifier 5. This requires that for optimum performance both vibrators have the same natural frequency. Helmholtz coils 9 associated with vibrator 8 are connected in series with Helmholtz coils 7. A resistance network comprising resistor 10, variable resistor, voltage divider or potentiometer 11, and resistor 12 are provided to permit adjustment over a small range of the ratio of the current in Helmholtz coils 7 to that in Helmholtz coils 9, as shown in the drawing. The light source 13, photocell 14, amplifier 15, and output meter 16 serve to measure the amplitude of vibration of vibrator 8, as explained in the copending applications referred to hereinabove.

The upper and lower Helmholtz coil and vibrator systems are mounted on a common frame, not shown in the drawing, provided with conventional means for adjusting the orientation of the upper system relative to the lower.

For simplicity, let us consider the operation when potentiometer 11 is set to equalize the Helmholtz fields. As will be understood from my copending application Ser. No. 569,819, the operation of the lower system automatically adjusts the total field component, that is, the resultant of the effective Helmholtz field component and of the effective earth field component, necessary to maintain the lower vibrator 2 in oscillation, to a small value which may be made of the order of 10 gammas ($10^{-4}$ oersteds), although for the purposes of the present invention it may be possible to make it of the order of 100 gammas ($10^{-3}$ oersteds) in order to increase the stability of the output of power amplifier 5 in locations subject to vibration. The field component actuating vibrator 2 will therefore be assumed to be 100 gammas ($10^{-3}$ oersteds). When the vertical component of the external field is the same at vibrator 8 as at vibrator 2, vibrator 8 will also be actuated by a field of 100 gammas, and its amplitude (and hence the reading of output meter 16, which is, assuming constant power output of power amplifier 5, proportional to the field actuating vibrator 8) will correspond to 100 gammas, if the upper vibrator system is identical with the lower vibrator system. If, however, the vertical component of the external field at vibrator 8 differs from the corresponding component at vibrator 2, the field actuating vibrator 8 will differ from 100 gammas by the same amount, and output meter 16 will have a correspondingly different reading.

By changing the ratio of the Helmholtz currents slightly by means of variable resistor or potentiometer 11, the upper field component actuating vibrator 8 can be made zero when the gradient is zero, if desired. Resistor or potentiometer 11 can be calibrated to check the gradient scale value of output meter 16 and to extend the range, as well as to check the sign of the gradient.

Adjustment of the relative positions of the Helmholtz coil and vibrator systems can be made in a place of negligible gradient by taking readings with the instrument at different orientations about a vertical axis and making adjustments until the same reading is obtained at all such orientations.

Strictly speaking, the instrument of Fig. 1 is not free from total field sensitivity, since the amplitude of oscillation and hence the output of power amplifier 5 depends on the external field component at vibrator 2, and hence the driving current for vibrator 8 is affected by changes in total field. In practice, however, this means only that a somewhat more accurate leveling of the instrument is required.

In the modification of the present invention diagrammatically shown in Fig. 2, each system operates to control its own Helmholtz current, the resistance network comprising resistors 107, 108 and variable resistor or rheostat 109 and the sensitive galvanometer 110 serving to measure the difference in Helmholtz currents and thus the difference in field components at the vibrators. It is understood that the sensitivity of galvanometer 110 may be increased by using it in combination with a direct current amplifier. Said meter may be mounted midway between the two vibrators, so that the effect of its field is the same on both. Rheostat 109 may be used for zero adjustment and for calibration.

Figure 3:
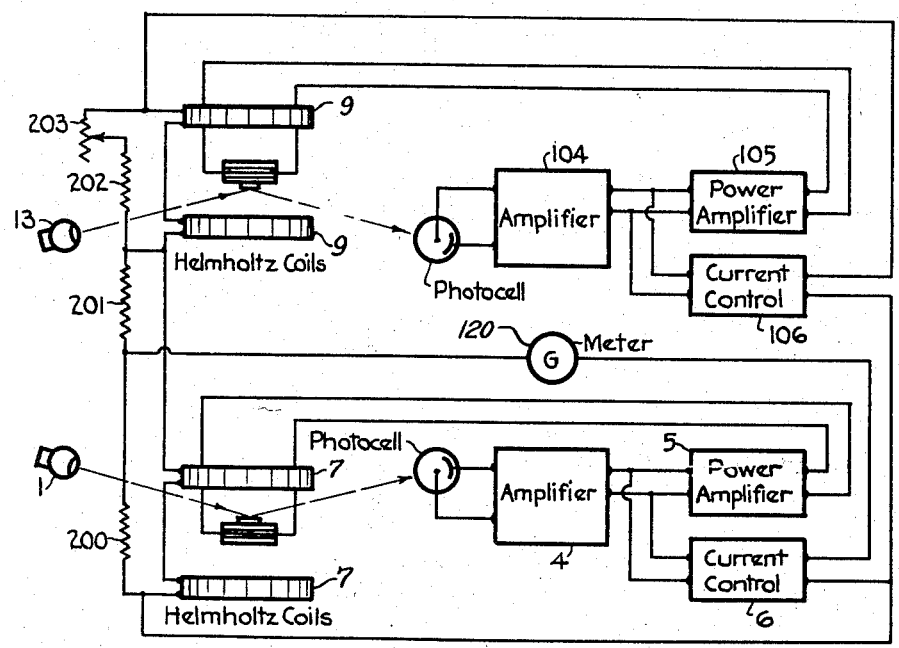
Figs. 3 and 4 are diagrams of other modified embodiments of the invention.

A third modification which permits the use of an ordinary milliammeter as the indicating device is diagrammatically shown in Fig. 3. It will be seen that Helmholtz coils 7 and 9 are so connected with regard to resistors 200, 201, 202, and variable resistor or rheostat 203 that one of the two vibrator systems, for example the upper system, adjusts both its own and most of the lower system's Helmholtz current; the range of current adjustment of which the other Helmholtz current control, for example control 6, is capable is available for making the difference in Helmholtz current between the two systems required by the difference in external field component between them. By making the resistance of resistor 200 sufficiently small in comparison to that of resistor 201 the full scale reading of milliammeter 120 can be made to represent as small a difference in field between vibrators as is desired. Rheostat 203 may be used for zero adjustment and calibration. If the meter zero is taken as the gradient zero, only one sign of gradient, that is, only changes of gradient in one direction, can be measured. This limitation can be overcome by obvious switching means interchanging in effect the upper and lower systems, if desired, but it is simpler to adjust the gradient zero to correspond to about one-third full scale on the meter for the most sensitive scale, it being understood that different scale ranges can be obtained by switching to different values of resistors 200 and 201 while preferably keeping their sum constant.

Figure 4:
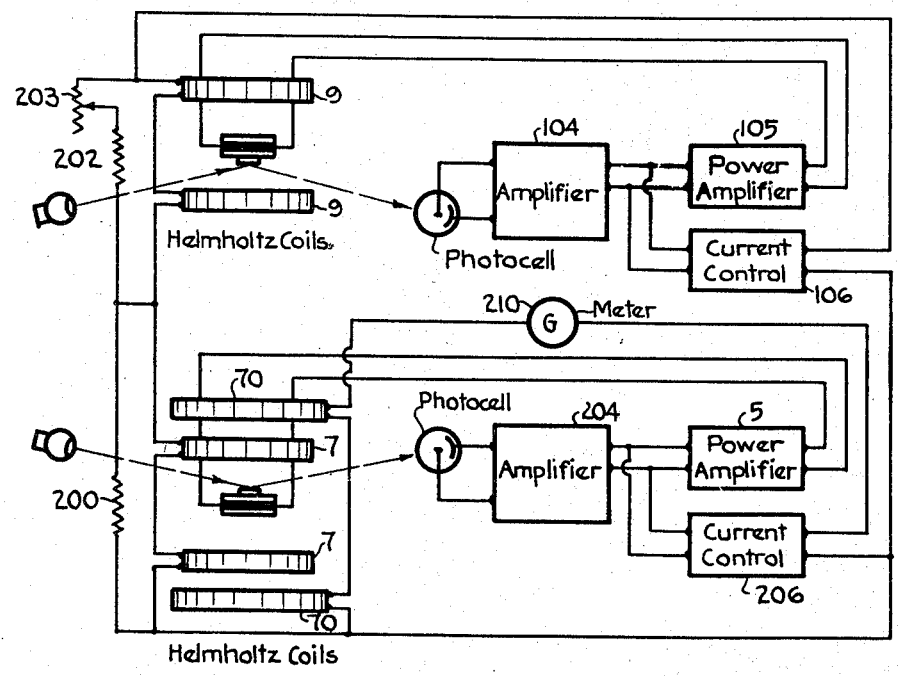

Fig. 4 shows a further modification of the present system, wherein the total current for the upper and lower Helmholtz coils is provided by one of the current controls, for example, the upper current control 106, whereas the lower current control 206 supplies current to additional Helmholtz coils 70, positioned about the lower oscillating coil to create an additional artificial field for said coil, thereby modifying the effect thereon of the field created by the Helmholtz coils 7. A meter 210 is used to indicate the current used to produce this additional field. Permanent magnets may likewise be used to modify the magnetic field in which the coils 2 and 8 are oscillating, in the manner disclosed in my copending application Serial No. 569,819.

It is understood that the zero adjustments provided in the three embodiments with regard to which the present invention has been described permit correction for inequality in mechanical dimensions of the sets of Helmholtz coils and for differences in orientation of sets of Helmholtz coils relative to vibrators.

I claim as my invention:

1. A system for measuring the gradient of a magnetic field, comprising first and second coils spaced from each other, means pivoting said coils for independent oscillation in said field, light source means, first and second photo-electric elements, optical means carried by said pivoted coils for varying the illumination of said photo-electric elements whereby the output current of said elements is varied proportionally to the oscillation of said pivotal coils, amplifier means energized by the outputs of said photo-electric elements, controlled rectifier means in circuit with said amplifier means for rectifying a portion of the output current of said amplifier means, Helmholtz coil means mounted coaxially with the pivoted coils in planes parallel and adjacent thereto, said Helmholtz coil means being energized by the direct current output of said rectifier means for neutralizing the magnetic field in which the pivoted coils oscillate, means in circuit with the amplifier means and said pivoted coils for passing through said pivoted coils the non-rectified portion of the output current of the amplifier means, and indicating means in circuit with said amplifier means for comparing the strength of the magnetic fields produced at the location of each of said pivoted coils as a resultant of said magnetic field and the neutralizing field of the Helmholtz coil means.

2. A system for measuring the gradient of a magnetic field, comprising first and second coils spaced from each other, means pivoting said coils for independent oscillation in said field, light source means, first and second photo-electric elements, first and second optical means carried by said first and second pivoted coils for varying the illumination of said first and second photo-electric elements respectively, whereby the output current of said elements is varied proportionally to the oscillation of said pivoted coils, first and second amplifier means energized by the outputs of said first and second photo-electric elements respectively, first and second controlled rectifier means in circuit with said first and second amplifier means respectively for rectifying a portion of the output current of each of said amplifier means, first and second Helmholtz coil means mounted coaxially with said first and second pivoted coils respectively in parallel planes adjacent thereto, parallel circuit means electrically connecting each of said Helmholtz coil means to the outputs of each of said controlled rectifier means, conductor means connected between said first and second pivoted coils and said first and second amplifier means respectively for passing through said pivoted coils a non-rectified portion of the output current of said amplifier means, adjustable resistance means in said parallel circuit means for adjusting the relative intensities of the currents passed through said first and said second Helmholtz coil means, and indicating means in said parallel circuit means for indicating the relative intensities of the currents passed through said first and second Helmholtz coil means when said pivoted coils are just maintained in a condition of oscillation by the reaction of the current passed therethrough with the field produced at the location of each pivoted coil as a resultant of the magnetic field being measured and the neutralizing field of the Helmholtz coil means.

3. A system for measuring the gradient of a magnetic field, comprising first and second coils spaced from each other, means pivoting said coils for independent oscillation in said field, light source means, first and second photo-electric elements, first and second optical means carried by said first and second pivoted coils for varying the illumination of said first and second photo-electric elements respectively, whereby the output current of said elements is varied proportionally to the oscillation of said pivoted coils, first and second amplifier means energized by the outputs of said first and second photo-electric elements respectively, first and second controlled rectifier means in circuit with said first and second amplifier means respectively for rectifying a portion of each of said amplifier means, first and second Helmholtz coil means mounted coaxially with said first and second pivoted coils respectively in planes parallel and adjacent thereto, circuit means connecting said first and second Helmholtz coil means in series to the output terminals of one of said rectifier means, branch circuit means connecting said second Helmholtz coil means to the output terminals of the other rectifier means, one of the output terminals of the first rectifier means being connected to one of the output terminals of the other rectifier means, conductor means connected between said first and second pivoted coils and said first and second amplifiers respectively for passing through said pivoted coils a non-rectified portion of the output current of said amplifier means, variable resistance means in said branch circuit for adjusting the relative values of the current passing through said first and said second Helmholtz coil means, and indicating means in said branch circuit for indicating the relative values of the currents passing through said first and second Helmholtz coil means when said pivoted coils are just maintained in a condition of oscillation by the reaction of the current passing therethrough with the magnetic field produced at the location of each pivoted coil as a resultant of the magnetic field being measured and the field of the Helmholtz coil means.

4. A system for measuring the gradient of a magnetic field, comprising first and second coils spaced from each other, means pivoting said coils for independent oscillation in said field, light source means, first and second photo-electric elements, first and second optical means carried by said first and second pivoted coils for varying the illumination of said first and second photo-electric elements respectively, whereby the output current of said elements is varied proportionally to the oscillation of said pivoted coils, first and second amplifier means energized by the outputs of said first and second photo-electric elements respectively, first and second controlled rectifier means in circuit with said first and second amplifier means respectively for rectifying a portion of each of said amplifier means, first and second Helmholtz coil means mounted coaxially with said first and second pivoted coils respectively in planes parallel and adjacent thereto, third Helmholtz coil means mounted coaxially with one of said pivoted coils in planes parallel and adjacent thereto, circuit means connecting said first and second Helmholtz coil means in series to the output terminals of one of said rectifier means, branch circuit means connecting said third Helmholtz coil means to the output terminals of the other rectifier means, one of the output terminals of the first rectifier means being connected to one of the terminals of the second rectifier means, conductor means connected between said first and second pivoted coils and said first and second amplifier means respectively for passing through said pivoted coils a non-rectified portion of the output current of said amplifier means, and indicating means in said branch circuit means for indicating the intensity of the current passed through said third Helmholtz coil means when said pivoted coils are just maintained in a condition of oscillation by the reaction of the current passed therethrough with the magnetic field produced at the location of each pivoted coil as a resultant of the magnetic field being measured and the field of the Helmholtz coil means.

CHARLES H. FAY.

REFERENCES CITED

The following references are of record in the file of this patent:

UNITED STATES PATENTS

| Number | Name | Date |
| --- | --- | --- |
| 1,831,744 | Laurent | Nov. 10, 1931 |
| 1,863,415 | Rieber | June 14, 1932 |
| 2,054,672 | Edgar | Sept. 15, 1936 |
| 2,151,627 | Vacquier | Mar. 21, 1939 |
| 2,220,788 | Lohman | Nov. 5, 1940 |
| 2,379,716 | Hull | July 3, 1945 |
| 2,406,870 | Vacquier | Sept. 3, 1946 |
| 2,407,202 | Vacquier | Sept. 3, 1946 |

FOREIGN PATENTS

| Number | Country | Date |
| --- | --- | --- |
| 397,167 | Great Britain | Aug. 14, 1933 |